United States Patent [19]

Spahr et al.

[11] Patent Number: 5,786,999
[45] Date of Patent: Jul. 28, 1998

[54] COMBINATION CONTROL FOR INJECTION MOLDING

[75] Inventors: David K. Spahr, Roscoe; Dennis C. Tibbitts, Rockford, both of Ill.

[73] Assignee: Barber-Colman Company, Loves Park, Ill.

[21] Appl. No.: 539,098

[22] Filed: Oct. 4, 1995

[51] Int. Cl.$^6$ .............. G06G 7/64; G06G 7/66; G06F 19/00
[52] U.S. Cl. .............. 364/475.05; 364/475.02; 364/475.03; 364/476.01
[58] Field of Search .............. 364/475.02, 475.03, 364/475.05, 476.01, 148, 151, 152, 161, 162; 425/145, 149; 264/40.5, 40.7

[56] References Cited

U.S. PATENT DOCUMENTS

| | | | |
|---|---|---|---|
| 3,797,808 | 3/1974 | Ma et al. | 259/191 |
| 3,859,400 | 1/1975 | Ma | 264/40 |
| 4,060,362 | 11/1977 | Wilson, III | 425/145 |
| 4,146,601 | 3/1979 | Bishop | 264/40.1 |
| 4,695,237 | 9/1987 | Inaba | 425/45 |
| 4,695,632 | 9/1987 | Kalk et al. | 544/194 |
| 4,774,675 | 9/1988 | Kagawa | 364/476 |
| 4,816,197 | 3/1989 | Nunn | 264/40.6 |
| 5,062,785 | 11/1991 | Stroud, III et al. | 425/145 |
| 5,176,858 | 1/1993 | Tsukabe et al. | 264/40.1 |
| 5,182,716 | 1/1993 | Stroud, III et al. | 364/476 |
| 5,266,247 | 11/1993 | Yokota | 264/40.4 |
| 5,293,852 | 3/1994 | Lehner et al. | 123/339 |
| 5,316,707 | 5/1994 | Stanciu et al. | 264/40.1 |
| 5,326,246 | 7/1994 | Usui et al. | 425/145 |
| 5,346,657 | 9/1994 | Hara et al. | 264/40.1 |
| 5,474,733 | 12/1995 | Kodie et al. | 264/328.1 |
| 5,533,884 | 7/1996 | Nakamura et al. | 425/145 |
| 5,550,744 | 8/1996 | Steinbichler | 364/476.01 |
| 5,552,690 | 9/1996 | Hiraoka | 318/632 |
| 5,554,326 | 9/1996 | Nakazawa et al. | 264/40.1 |
| 5,578,256 | 11/1996 | Austin | 264/40.1 |

*Primary Examiner*—Reba I. Elmore
*Assistant Examiner*—Ramesh Patel
*Attorney, Agent, or Firm*—Leydig, Voit & Mayer, Ltd.

[57] ABSTRACT

An adaptive controller is provided for controlling the velocity of a ram in an injection molding apparatus during the injection stage of the molding cycle. The controller includes two sets of parameters. The first set define an open-loop control equation for controlling the ram velocity. The second set of parameters define a closed-loop control equation for controlling the ram velocity. Control of the ram, during the injection stage, is partitioned into discrete segments, wherein the open-loop control equation governs during the first portion of each segment, and the closed-loop equation governs during the latter portion of each segment. Both control equations are designed to drive the ram at a set, target velocity. At the end of each segment, a processor evaluates the actual ram velocity with the set, target velocity. Based upon this evaluation, the first and second set of parameters are modified to improve the ram performance and efficiency on the subsequent injection cycle.

16 Claims, 6 Drawing Sheets

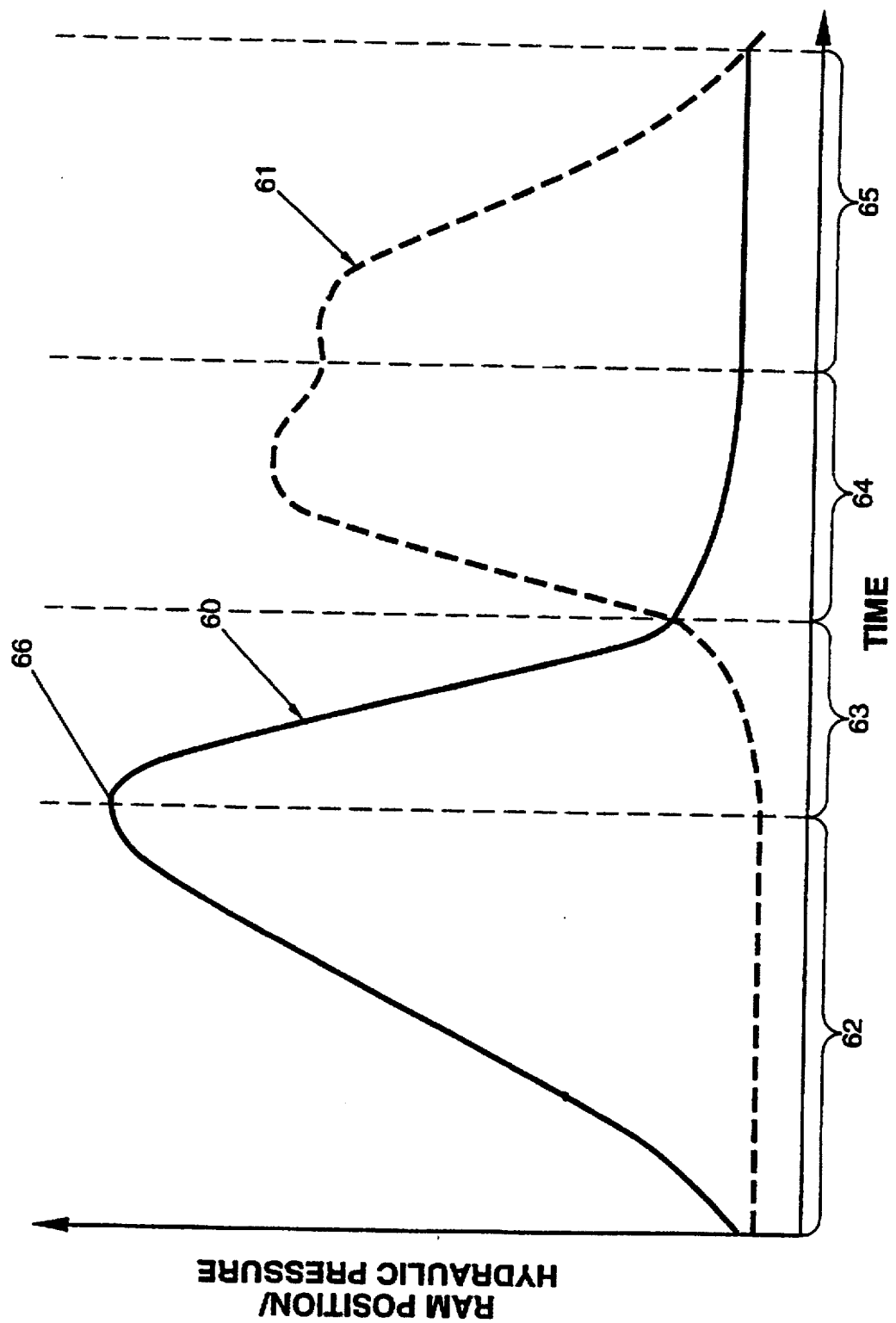

COMBINATION CONTROL FOR INJECTION MOLDING

BACKGROUND OF THE INVENTION

1. Field of the Art

The present invention relates to injection molding apparatus controllers, and more particularly, to a controller for controlling the injection stage of an injection molding apparatus.

2. Discussion of the Related Art

As is well known, injection molding apparatus operate to form solid, plastic objects by injecting molten plastic into a mold cavity, the mold cavity defining the shape of the solid object. The process of creating an injection molded object is broadly defined in four process stages. The first stage is the plastication stage, in which granulated plastic material is introduced and melted within a cylinder. The second stage is the injection stage, in which the molten plastic material is forced from the cylinder into an injection mold that is in fluid communication within the cylinder. Next is the packing stage which begins once the injection mold has filled with molten plastic. During this stage, additional molten plastic is forced into the mold to accommodate shrinkage as the plastic cools in the mold cavity. Finally, the last stage is the holding stage. In this stage, the plastic is maintained at a substantially constant pressure as the plastic solidifies to control plastic properties, such as density and resilience.

To more particularly describe the injection stage of this process, a ram is disposed within the cylinder and is controlled to move within the cylinder to force the molten plastic out of the cylinder and into a mold cavity.

Typically the velocity of the ram is closely controlled (plastic pressurization may alternatively be controlled) during the injection stage. Because plastic is flowed to sequentially fill spaces within the mold cavity, the velocity of the ram is preferably controlled in accordance with the interior cavity space being filled. Filling small areas too quickly can result in burning of the plastic, while filling the spaces too slowly may result in voids. It is appreciated that either of these outcomes may result in products that are undesirable and possibly unusable.

Accordingly, and since the sequential cavity spaces vary in size, the injection cycle is partitioned into a plurality of portions or segments, with each segment corresponding to a small portion of time. The collective group of segments is known in the art as a "profile," and a target ram velocity is assigned to each segment of the profile. In this way, a varied ram velocity is defined over the range of ram movement as the ram forces plastic from the cylinder and into the injection mold. Typically, the target ram velocity values (also known as setpoints) are set initially by operators who derive the value from a combination of experience, experimentation, and formulas. These values may be stored on a controller card or other module that can be inserted or removed from the system's computer. In this way, a given module may be associated with a particular mold, and such modules may be interchanged as particular molds are interchanged.

A problem has been identified in typical closed-loop control devices designed to operate in this fashion.

Notably, when the setpoints of two consecutive segments differ, there is a jump discontinuity at the segment border. This tends to make smooth and effective control exceedingly difficult. More specifically, the closed-loop controller parameters (e.g., gain coefficients and other terms that define controller damping) become more difficult to establish over-damping the controller to lessen the intense effect of the jump discontinuity may diminish both the efficiency and the response time of the controller, while underdamping the controller will often result in untoward overshoot in the output.

One general approach taken to solve this problem is to combine open-loop and closed-loop control. During the early portion of each segment open-loop control is effected, while closed-loop control is employed at the end of each segment. At the start of each segment, a new setpoint is input to the controller and open-loop control is applied to rapidly ramp the output, and therefore the ram, toward the setpoint target velocity. After a period of time, ram control is switched to closed-loop control—which includes a controlled feedback term as the closed-loop control continues to move the ram at or toward the same target velocity. Systems operating in this fashion benefit from the rapid response of open-loop control, without unduly complicating the design and implementation of the closed loop control.

Examples of this type of control are disclosed in U.S. Pat. Nos. 5,062,785 and 5,182,716, both to Stroud, III et al. Both of these patents are generally directed to the control of the injection stage of an injection molding apparatus, utilizing combined open-loop and closed-loop control and segment "profiles" as described above. More particularly, these patents seek to achieve improved performance of such "combined" injection molding apparatus by employing what they call "corrective learning" over time. Generally, this learning is accomplished by comparing the targeted (or profiled) controller operation with the actual, observed controller response. This evaluated information is then used to modify the controller input, and therefore response, from injection cycle to injection cycle.

Specifically, both the '716 and '785 patents update the segment setpoints that are stored in memory and which define the cycle profile. The patents differ in the manner in which they update the setpoints. At the end of a given segment, the '716 patent compares the output from the open-loop controller (at the end of the open-loop control) with the output from the closed-loop controller, and the difference is used to compute the new setpoint. The '785 patent teaches that, for very short time-duration segments, the comparison between the open-loop and closed-loop controlled variables may not differ substantially. Therefore, in such instances it is desired to update the segment setpoints by comparing process variables (e.g., ram position, ram pressure, and cavity pressure) at the end of a segment to the current setpoint, and use that difference to change the setpoint stored in memory.

There are, however, various shortcomings to the approaches disclosed in the '716 and '785 patents. Significantly, the approach taken under both of these patents is to modify the profile setpoints, and therefore the target values of the controller. Ideally, these target values are set to conform to a particular mold shape and should remain substantially fixed. Updating the setpoints in this way may cause the system target values to wander over time.

Another shortcoming of the systems described in the '716 and '785 patents is observed where there is a substantial difference between the target values and the apparatus response, dictating large changes in the setpoint values. Such a differential may be due to a number of operating or environmental conditions. Therefore, target values (which are ideally based upon mold cavity size and shape) become dependent on other parameters. If the apparatus is shut down and restarted for a later production run where the environmental conditions have materially changed, the target values may be way off, resulting in the molding of poor quality or unusable parts.

SUMMARY OF THE INVENTION

Accordingly, it is a primary object of the present invention to provide a controller for an injection molding apparatus having improved control of an injection ram during the injection stage.

A more specific object of the present invention is to provide a controller for an injection molding apparatus which provides adaptive learning from injection cycle to injection cycle, without altering the setpoints.

Another object of the present invention is to provide a controller for an injection molding apparatus having improved automation features.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, the present invention is generally directed to a controller for use with an injection molding apparatus having a ram that moves within a cylinder to force molten plastic contained within the cylinder into an injection mold that is disposed in fluid communication with the cylinder. In accordance with one aspect of the present invention, the controller includes a first set of parameters that operate upon a setpoint to define a first control equation for controlling the movement of the ram in an open-loop mode. A second set of parameters is included, which operate upon the same setpoint to define a second control equation for controlling the movement of the ram in a closed-loop mode. A memory stores the first and second sets of controller parameters for subsequent retrieval and usage. Finally, a processing means is disposed in communication with the memory and is configured to retrieve the first and second sets of parameters and effect controlled movement of the ram in accordance with the first and second of control equations. The processor is further configured to evaluate the movement of the ram in comparison to the setpoint and update the first and second sets of controller parameters for use in subsequent injection cycles.

In accordance with the method of the present invention, a ram of an injection molding apparatus is controlled during the injection stage of an injection cycle to move within a cylinder containing molten plastic to force the plastic from the cylinder and into a mold. The method includes the step of retrieving from memory a first and second control equation. During a first portion of each segment, the movement of the ram is controlled in accordance with a first, open-loop control equation (assuming that the open-loop control equation is different from the previous segment's open-loop control equation). During the second portion of each segment, the movement of the ram is controlled in accordance with a second, closed-loop control equation. Near the end of each segment, the movement of the ram is evaluated to compare the actual velocity of the ram with the output of the controller. Based upon this evaluation, parameters defining the first and second control equations are updated for use in the corresponding segments of subsequent injection cycles.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 2 is a graph illustrating ram position and pressure curves over the four injection molding stages;

DETAILED DESCRIPTION OF THE PREFERRED EMBODIMENT

Figure 1:
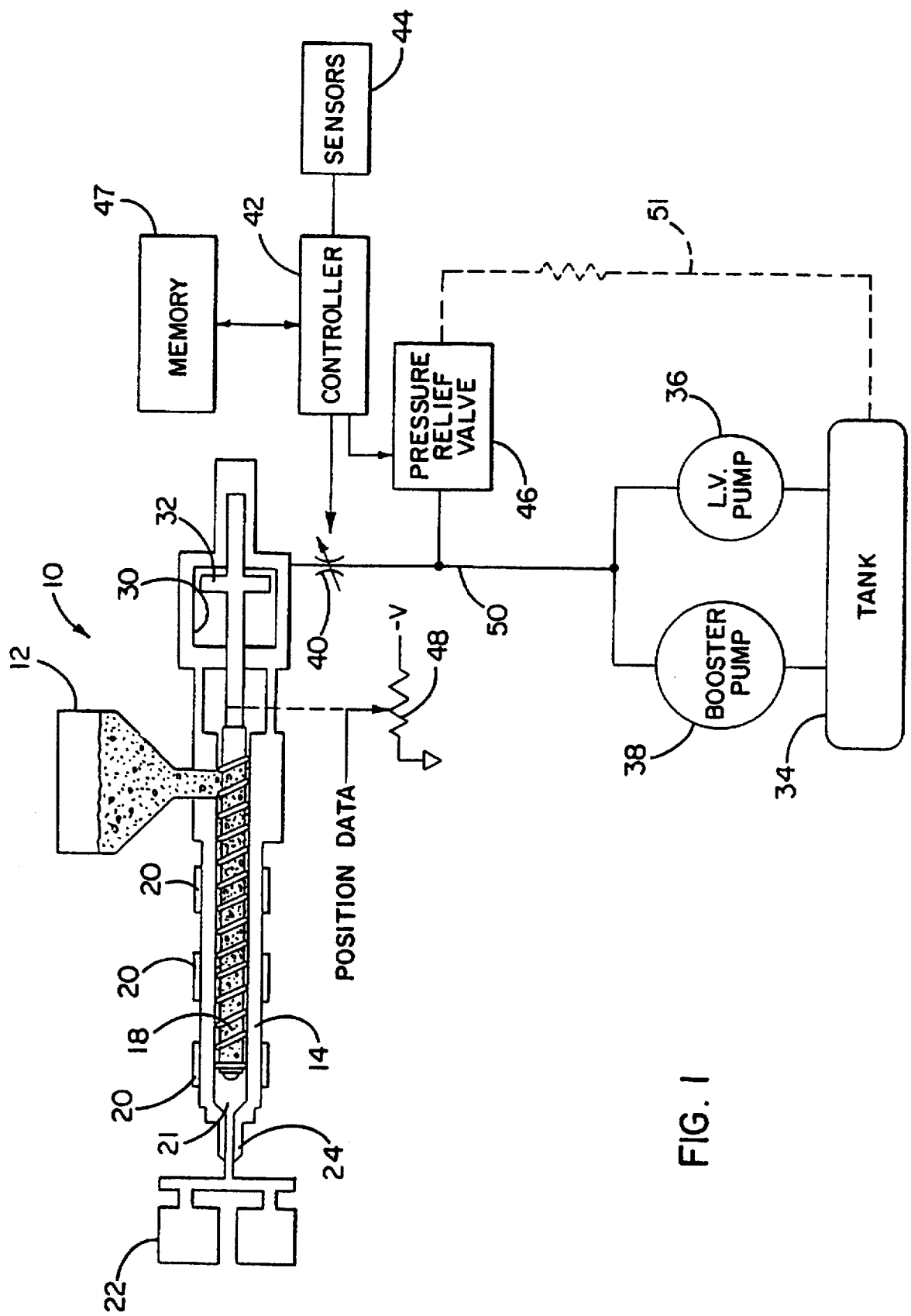
FIG. 1 is diagram illustrating the fundamental components of both an injection molding apparatus and a hydraulic drive system.

Referring now to the drawings, FIG. 1 illustrates a typical injection molding system, which defines the general environment of the present invention. An injection molding apparatus, generally designated by reference numeral 10, broadly includes a hopper 12, a barrel or cylinder 14, and a hydraulic drive system 16. Fine particles of plastic material are loaded into the hopper 12 and fed by gravity from the hopper 12 to the rear portion of the cylinder 14. A plasticating screw 18 is disposed within the cylinder 14 and is rotatably driven to carry the plastic material forward by the augering action of the rotating screw 18. Heater bands 20 are disposed on the outside of the cylinder 14 to heat the cylinder and therefore melt the plastic material. Indeed, as the plastic material moves forward within the cylinder 14, it absorbs heat from the cylinder walls (delivered by the heater bands 20) and from the work energy developed by the screw 18. Cylinder 14 temperatures during this stage typically range from 400 to 500 degrees fahrenheit. In this way, plastic material is melted as it is carried forward, and molten plastic is therefore accumulated at the front end 21 of the cylinder 14.

As molten plastic builds up in this area 21, the screw 18 is forced backward. Once a sufficient amount of plastic material (i.e., shot size) has accumulated in the front end 21 of the cylinder 14, then the apparatus 10 enters the injection stage to force the molten plastic from the cylinder 14 into a mold 22. As previously mentioned, the foregoing stage is known as the plastication stage.

During the injection stage, molten plastic accumulated in the front end 21 of the cylinder 14 is controllably injected into a mold 22 having an internal cavity defining a shape of a plastic object to be moldably created. A nozzle 24 is opened to permit molten plastic to flow from the cylinder 14 into the mold 22. As will be described below, the flow rate of the plastic is controlled by a hydraulic drive system 16, which broadly operates to lineally reciprocate the screw 18 forward within the cylinder 14, thereby forcing molten plastic from the cylinder 14 through the nozzle 24 and into the mold 22. In this regard, the tip of the reciprocating screw 18 is usually equipped with a non-return check valve (not shown) to prevent the molten plastic from slipping back through the screw flights during injection.

It is broadly desired to reciprocate the screw 18 at a relatively high velocity to quickly fill the mold 22. As the mold 22 becomes full, however, the velocity of the screw 18 is greatly reduced and the apparatus 10 enters the packing stage. Having stated this broad objective, it is more specifically desired to vary the relatively high velocity of the reciprocating screw 18 (and thus the flow rate of the molten plastic) during the injection stage in dependence upon the particular shape of the internal cavity of the mold 22, as the spaces within the mold 22 are filled. Accordingly, and as is known, the injection stage is further partitioned into segments, with each segment being defined by a velocity setpoint that, together, define a velocity profile for the injection stage.

Brief mention should be made at this point that both the velocity of the reciprocating screw 18 and the pressure within the mold cavity are important working parameters for the injection molding process. For example, a changed in material viscosity is reflected as a change in ram speed and can be detected by measuring ram position with respect to time. A change in material viscosity also reflects itself as a change in plastic pressure and can be detected by measuring mold cavity pressure with respect to time. Other variations in molding conditions can be detected by monitoring the screw 18 velocity and plastic pressure. Since it is possible to detect variations in molding conditions, it is also feasible to compensate or correct for these variations.

In keeping with the description of FIG. 1, attention will now be directed to the hydraulic system 16 which controls the lineal movement of the screw 18. An injection cylinder 30 is located off the end of the cylinder 14 opposite the mold 22. A ram 32 fixed on the shaft of the screw 18 serves to partition the injection cylinder 30 into forward and rear compartments. A tank 34 containing hydraulic fluid is disposed in fluid communication with the injection cylinder 30. Fluid from the tank 34 is preferably pumped by a low volume pump 36 and booster pump 38 for delivery to the injection cylinder 30. Typically, the booster pump 38 is utilized only during the high velocity injection stage of the injection molding process.

The transfer of hydraulic fluid from the tank 34 to the injection cylinder 30 is controlled by a flow control valve 40 and a pressure relief valve 46, which in turn are controlled by a controller 42. As a general illustration of this control, during the injection stage of the injection molding process, the pressure relief valve 46 is held full-open, and the flow control valve 40 is preferably controlled to control the rate of hydraulic fluid transferred to the injection cylinder 30. The controller 42 will vary the aperture of the flow control valve 40, based on an evaluation of the measured ram velocity in comparison to the desired ram velocity. During the packing stage, it is desired to control the pressure applied to the plastic rather than ram velocity (since ram velocity is substantially zero during the packing stage). This pressure control is achieved by fully opening the flow control valve 40, and controllably varying the pressure relief valve 46. As the pressure in line 50 exceeds the limit established by the pressure relief valve 46, a portion of the hydraulic fluid is channeled via line 51 back to the tank 34. In this way, a constant pressure is maintained in line 50 and therefore in the injection cylinder 30.

It will be appreciated that, in practice, the hydraulic control is more sophisticated than the schematic diagram presented in FIG. 1. Specifically, the lineal velocity of the reciprocating screw 18 is controlled by controlling the flow of hydraulic fluid between the forward and rear compartments of the injection cylinder 30, as divided by the ram 32. Controlling the fluid to apply higher pressure to the rear compartment results in a lineal movement of the screw 18 toward the injection mold 22. Applying a higher pressure in the forward compartment moves the reciprocating screw 18 rearwardly (away from the injection mold 22). During the injection cycle, it will always be desired to move the ram 32 and thus the screw 18 toward the mold 22. Therefore, the rear compartment of the injection cylinder 30 will always be of relatively high pressurization in comparison to the forward compartment.

The above-described ram 32 control is actually achieved through a somewhat more complex valving structure. The valving structure that has been illustrated as the flow control valve 40, in practice, includes valves that circulate fluid from line 50 to either the forward or rear compartment of the injection cylinder 30, and from the opposite compartment back to the tank 34. The specific control of this more complex valve structure, in order to achieve controlled movement of the ram, is known in the art and does not form part of the present invention. Instead, the present invention is directed to the broader aspects of the ram velocity and pressure control. Accordingly, the illustrated valving structure has therefore been simplified to better explain the operation of the present invention.

During the injection stage, when the ram velocity is controlled, the actual ram velocity may be determined by evaluating the change in ram position over time. The ram position, in turn, may be detected by a number of conventional ways, such as position potentiometer 48. This position data is then fed to controller 42 for processing. As shown in FIG. 1, a block denoted as sensors 44 is broadly shown as feeding into the controller 42. The sensors 44 can include position as well as pressure sensors. For example, there are typically pressure sensor associated with the injection cylinder 30 to detect and evaluate the pressure of the hydraulic fluid in both the forward and rear compartments. Likewise, there may be pressure sensors in the cavity of the injection mold 22 to detect the pressure of molten plastic as it is forced into the mold 22. The preferred embodiment of the present invention monitors ram velocity by evaluating ram position sensors.

Furthermore, and consistent with the concepts and teachings of the present invention, a combination of pressure and position sensors may be monitored to ascertain the ram velocity. It is anticipated that more sophisticated systems will use this approach as it will permit varied control for plastics of different viscosities, as previously mentioned.

Having described the general structure and operation of an injection molding apparatus, reference will now be made to FIG. 2, which shows typical pressure and position curves for a complete injection cycle of an injection molding apparatus. The graph illustrates time along the horizontal axis and ram position/pressure along the vertical axis. Specifically, the ram position vs time plot 60 is illustrated in solid line, while the hydraulic fluid or ram pressure vs time plot 61 is illustrated in dash line.

Looking first at the ram position vs time plot 60, it is seen that at the start of the cycle (i.e., time=zero), the value of the ram position is at a minimum. This indicates that the ram or screw is nearest the injection mold 22 (i.e., the ending position from the previous injection cycle). As previously described, during the plastication stage 62, plastic is fed from the hopper 12 (FIG. 1) into the cylinder 14 and melted, the screw 18 and therefore ram 32 begins to back away from the mold 22. Once the ram 32 reaches a particular peak position 66, indicating that sufficient plastic has been melted to fill the mold 22 (i.e., shot size), then the system enters the injection stage 63. In this stage, the ram 32 is rapidly forced forward to inject the molten plastic into the mold 22. As the ram 32 nears its starting position, the system enters the pack stage 64. Finally, the ram 32 reaches the end of its stroke and is maintained in that position throughout the hold stage 65.

The ram pressure plot 61 is also illustrated for the four stages of an injection molding cycle. During the plastication stage 62, before the cylinder 14 has filled with plastic, the ram or plastic pressure is a minimum. The pressure, however, changes through the injection cycle 63. Near the end of the injection stage, as the mold 22 becomes substantially filled with molten plastic, the mold pressure begins to rise substantially, reaching a maximum during the packing stage. Thereafter, during the holding stage 65 the mold pressure trails off to once again reach its minimum value.

As previously described, each of the four stages (or at least the injection, packing, and holding stages) are further segmented for control purposes. During the injection stage 62 the ram 32 velocity (i.e., change in position over time) may be closely controlled. During the packing 63 and holding 64 stages, the hydraulic fluid pressure (driving the ram) is closely controlled. And this control is achieved by defining particular target values or setpoints for the ram 32 velocity or pressure during the specific segments within a given stage. It is understood that the hydraulic pressure is related to the mold pressure, and thus controlling the hydraulic pressure, in turn, controls the mold pressure (while the plastic is in its molten state).

Figure 3A:
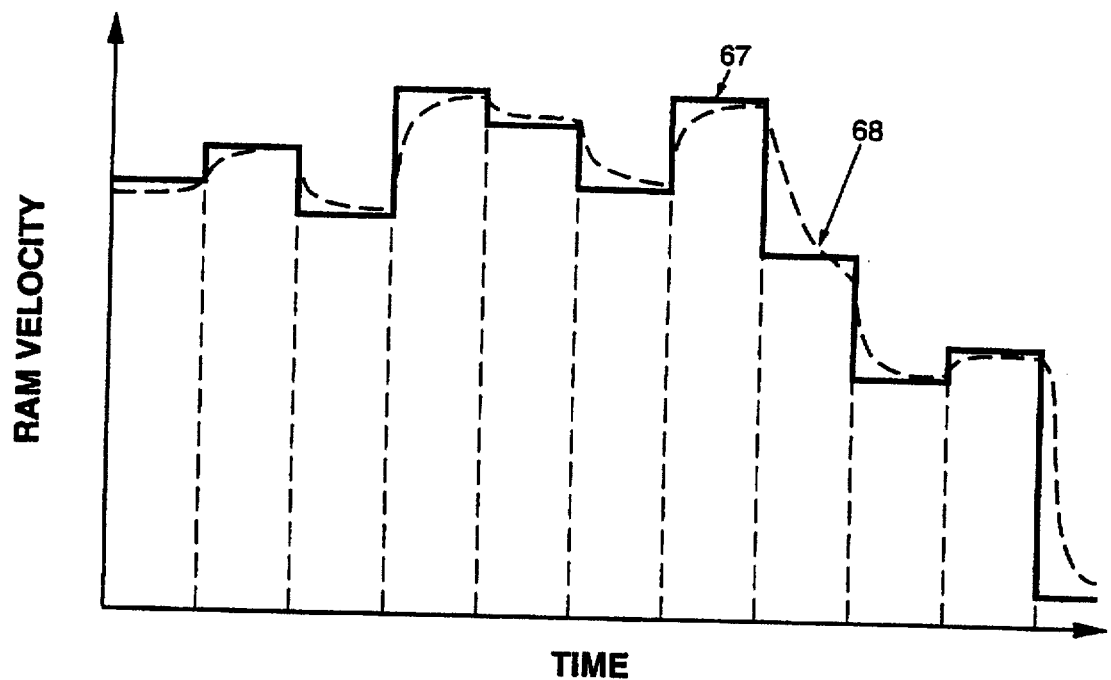
FIG. 3A is a graph illustrating a hypothetical velocity curve (in dashed line) overlaid with a segmented velocity curve defined by setpoints (in solid line) for an injection stage of an injection molding cycle.

To more clearly illustrate this point, reference is made to FIG. 3A, which shows a curve of ram velocity vs time in a hypothetical injection stage 63. Segments are illustrated by the dashed vertical lines, and target curve 67 or setpoints are illustrated by the solid line. The segments have been illustrate as being of equal width, and thus equal time duration. It is appreciated that, consistent with the concepts and teachings of the present invention, the segments may be of differing time durations, depending upon the particular size and shape of the mold cavity. It is further understood that the packing and holding stages are similarly partitioned into segments. During these stages, however, the ram pressure, rather than velocity, is targeted and controlled.

Figure 3B:
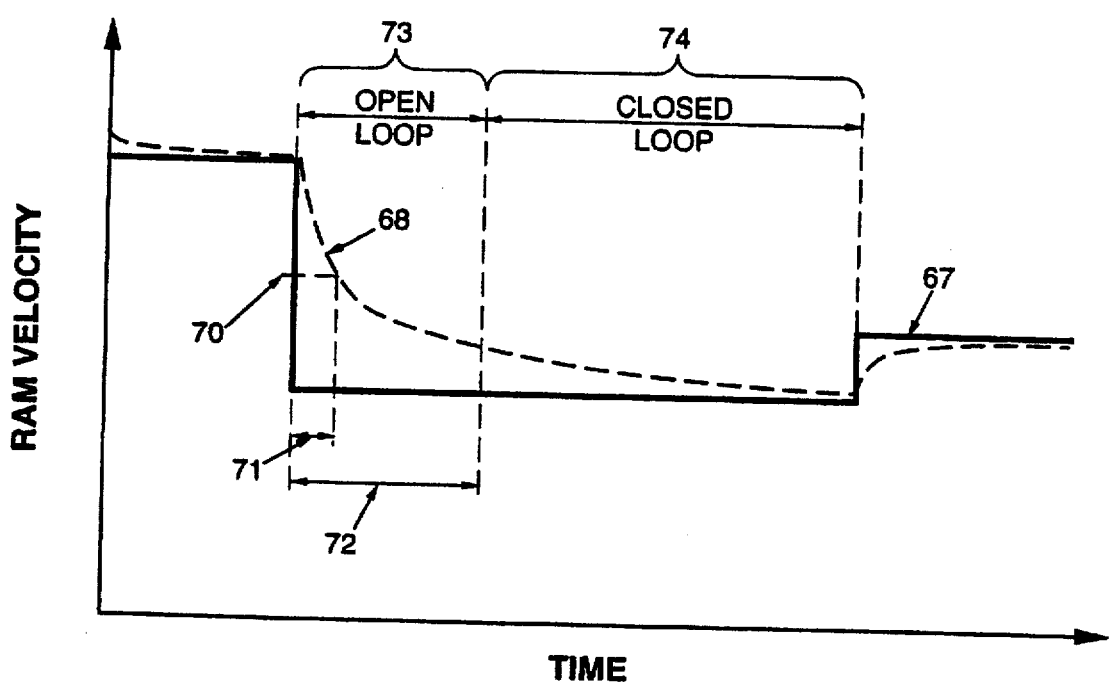
FIG. 3B is a graph illustrating segmented velocity curves (in dashed line) overlaid with actual velocity curves (in solid line) for a portion of an injection stage.

Also shown in dashed line is a hypothetical measured velocity curve 68. As illustrated, this curve generally tracks the targeted curve 67, but is characterized by a delay or lag. FIG. 3B better illustrates this lag, and shows an expanded portion of the curves 67 and 68. During the early portion of a given segment, the control of the ram 32 velocity is governed by an open-loop control equation. In contrast, the later portion of a given segment, the ram 32 velocity is governed by a closed-loop control equation. The particular control equations will be described below, in connection with FIG. 4.

To more particularly describe the ram 32 control, at the beginning of a given segment the target value or setpoint for that segment is retrieved from memory and the ram 32 is controlled (open-loop) to approach that value. This results in a steep progression of curve 68 toward the new segment setpoint value. It has been learned through experience that the actual path of curve 68 (i.e., response of the ram 32) will substantially follow an exponential curve. Assuming that the actual response will behave substantially exponentially, the open-loop control time is approximated as four times the time required to achieve one-half the targeted value.

The full segment illustrated in FIG. 3B shows a setpoint value much lower that the previous segment's setpoint value, and thus a steep downward progression of the actual ram velocity curve 68. When the new setpoint is retrieved from memory, it is compared to the previous setpoint and the midway point 70 is calculated. When the actual velocity curve 68 reaches this midway value 70 the time duration 71 required to reach that point is noted. This represents one-fourth of the time 72 required for the open-loop 73 control mode. Thereafter, the remaining portion of the segment is controlled pursuant to closed loop control 74. It should be appreciated that, consistent with the present invention, other means for determining and apportioning the open-loop/closed-loop timing could be employed.

While the time value 72 may be calculated anew for each segment, it has been found that the time 72 is substantially the same from segment to segment. Therefore, consistent with the invention, it could be calculated a single time, and thereafter utilizes the once-calculated time in switching from open-loop to closed loop control. In the preferred embodiment, a running average is maintained for this time, and this average is stored in a memory location and updated after each additional segment for a particular mold cycle.

Figure 4:
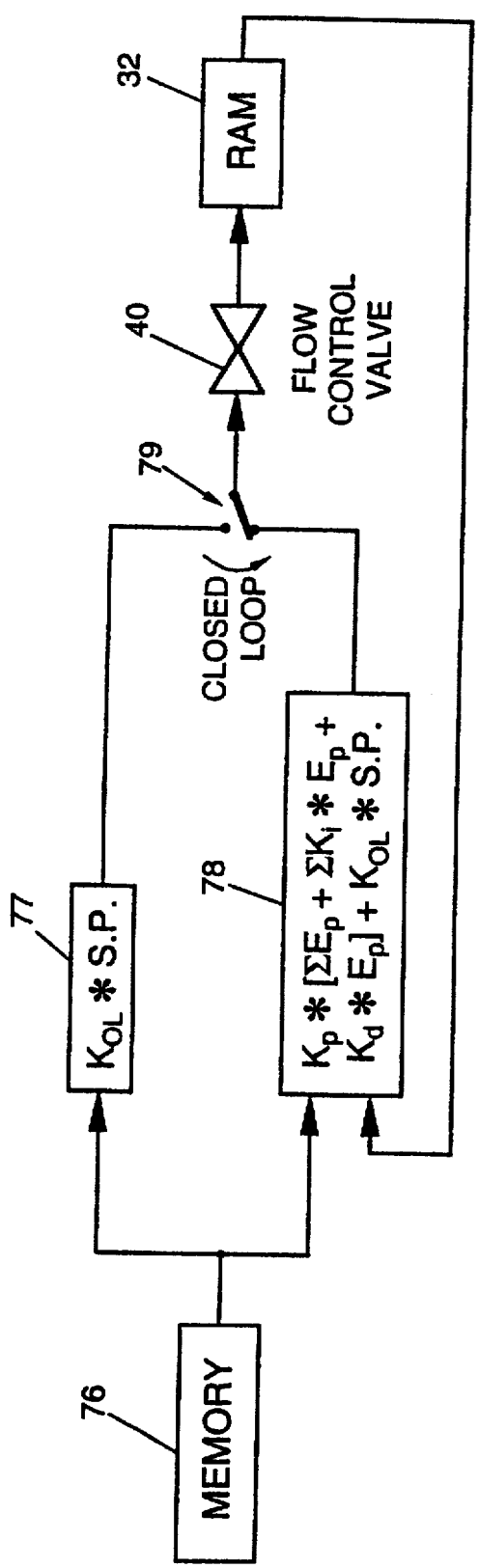
FIG. 4 is a block diagram depicting a conceptual organization of the software flow in connection with the controlled hardware components.

Turning now to FIG. 4, a block diagram is shown which illustrates the combined open-loop and closed-loop control. As previously mentioned, a profile of setpoints is stored in memory 76, and these setpoints are utilized to define a target velocity curve (during the injection stage) for the ram 32. Indeed, the setpoints are utilized to set the aperture of a flow control valve 40, which controls the differential hydraulic pressure in the forward and rear chambers of the injection cylinder 30 (See FIG. 1). During the initial portion of a given segment the flow control valve 40 is controlled according to an open-loop control equation 77, and during the latter segment portion a closed-loop control equation 78 governs the valve 40 control. Preferably, the open-loop control equation 77 is:

Output=$K_{OL}$*Setpoint, and the closed-loop control equation 78 is:

Output=$K_p$*[$\Sigma E_p$+$\Sigma K_i$*$E_p$+$K_d$*$E_p$]+$K_{OL}$*Setpoint. In the foregoing equations:

KOL=controller output/actual ram velocity
$E_p$=Setpoint−actual ram velocity
$K_d$=0
$K_p$=0.5*$K_{OL}$
$K_i$=1/(0.5*$K_p$*steptime), where the steptime is one-half of the open-loop time. Each of the foregoing control parameters is calculated at the end of the segment, and is stored in memory for use in the corresponding segment of the next cycle (i.e., same segment for the next part). The $K_{OL}$ term is also referred to as the open-loop gain coefficient, and operates to adjust the open-loop gain, for a particular segment, from cycle to cycle. Thus, this gain coefficient value is adjusted to minimize the deviation between the target ram velocity (as reflected in the controller output) and the actual ram velocity. The $E_p$ term is an error term, representing the deviation between the setpoint and the actual ram velocity. The $K_p$, $K_i$, and $K_d$ terms are controller coefficients for proportional, integral, and derivative controller terms. In the output equation, the summation symbols represent the summation of the indicated controller terms for the segments of a given mold cycle, and are reset from cycle to cycle.

As is appreciated from the foregoing equations, the target values or setpoints are never altered, but remain fixed from mold cycle to mold cycle. Nevertheless, the molding apparatus provides extremely flexible and adaptive control from cycle to cycle, by virtue of its ability to update the control parameters.

There are generally two modes of operation of the present invention: an operator controlled mode, and an automatically-tuned mode. The above-listed equations depict the automatically-tuned mode. In this mode the controller is preprogrammed with certain default values for the control parameters (e.g., $K_{OL}=1$), and it automatically tunes or adjusts these parameters over the course of several injection cycles. In this mode $K_d$ is set to zero, so that the differential term drops out of the equation. Alternatively, the various control parameters (with the exception of the $K_{OL}$ term) may be set by an operator and remain fixed through the injection cycle. This is known as the operator controlled mode. In this mode, however, the $K_{OL}$ term is modified by the controller 42, to provide dynamic and adaptive controller performance. It is observed from the equations that modifying $K_{OL}$ will alter both the open-loop and closed-loop control equations.

It is further appreciated that FIG. 4 has been presented merely for purposes of illustration and conceptualizing the preferred control. That is, a switch 79 has been illustrated as switching the flow valve 40 and thus ram 32 from open-loop to closed-loop control. Feedback from the ram 32 is illustrated as only being fed back to the closed-loop control block 78. And the memory block 76, containing the profile setpoints, is shown as providing the inputs to both the open-loop 77 and closed-loop 78 control blocks. In practice, the entirety of blocks 76–78 and switch 79 are performed by software and computer control.

Figure 5A:
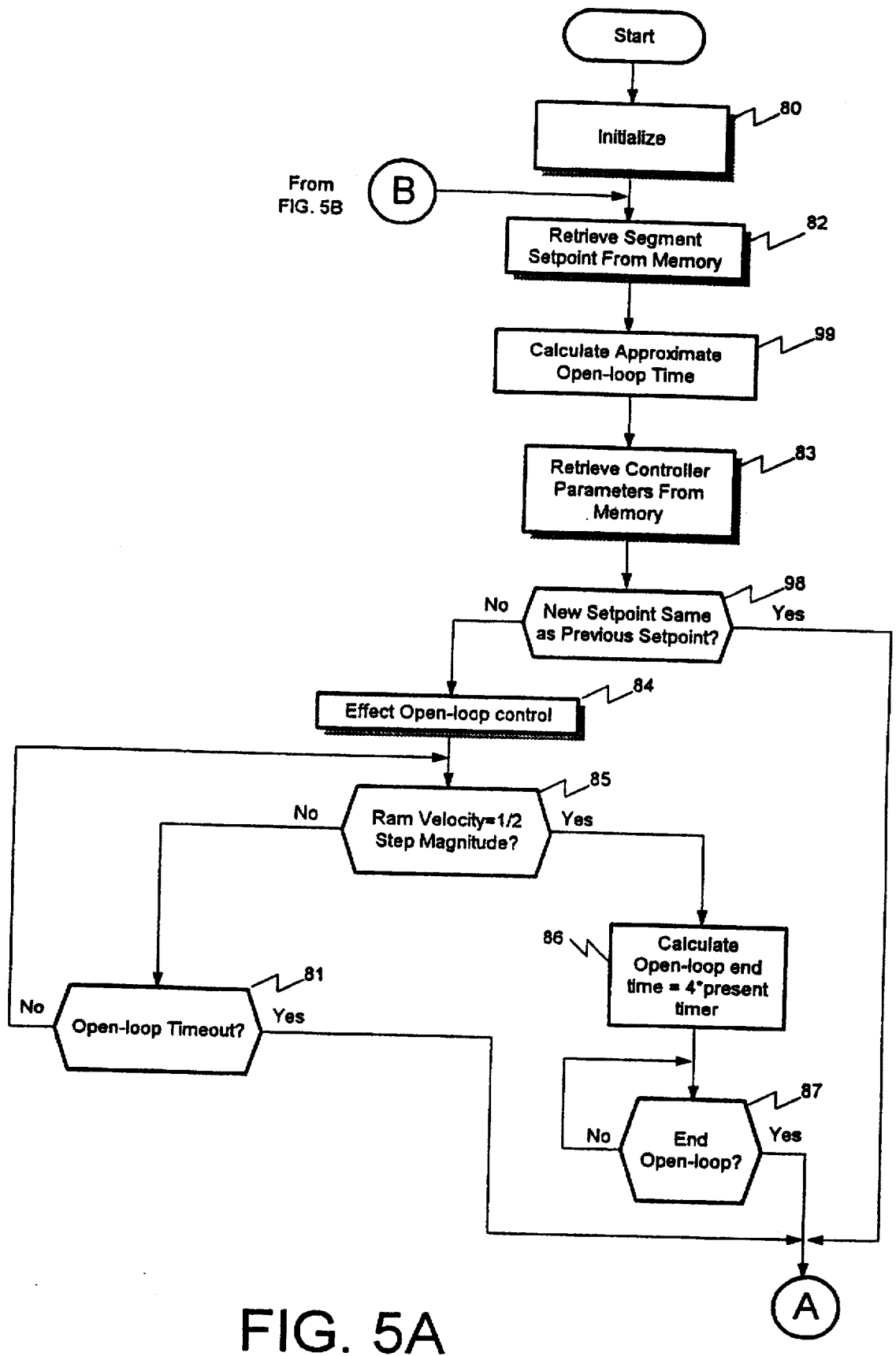
FIGS. 5A and 5B collectively depict a top-level software flowchart of the controller operation.
Figure 5B:
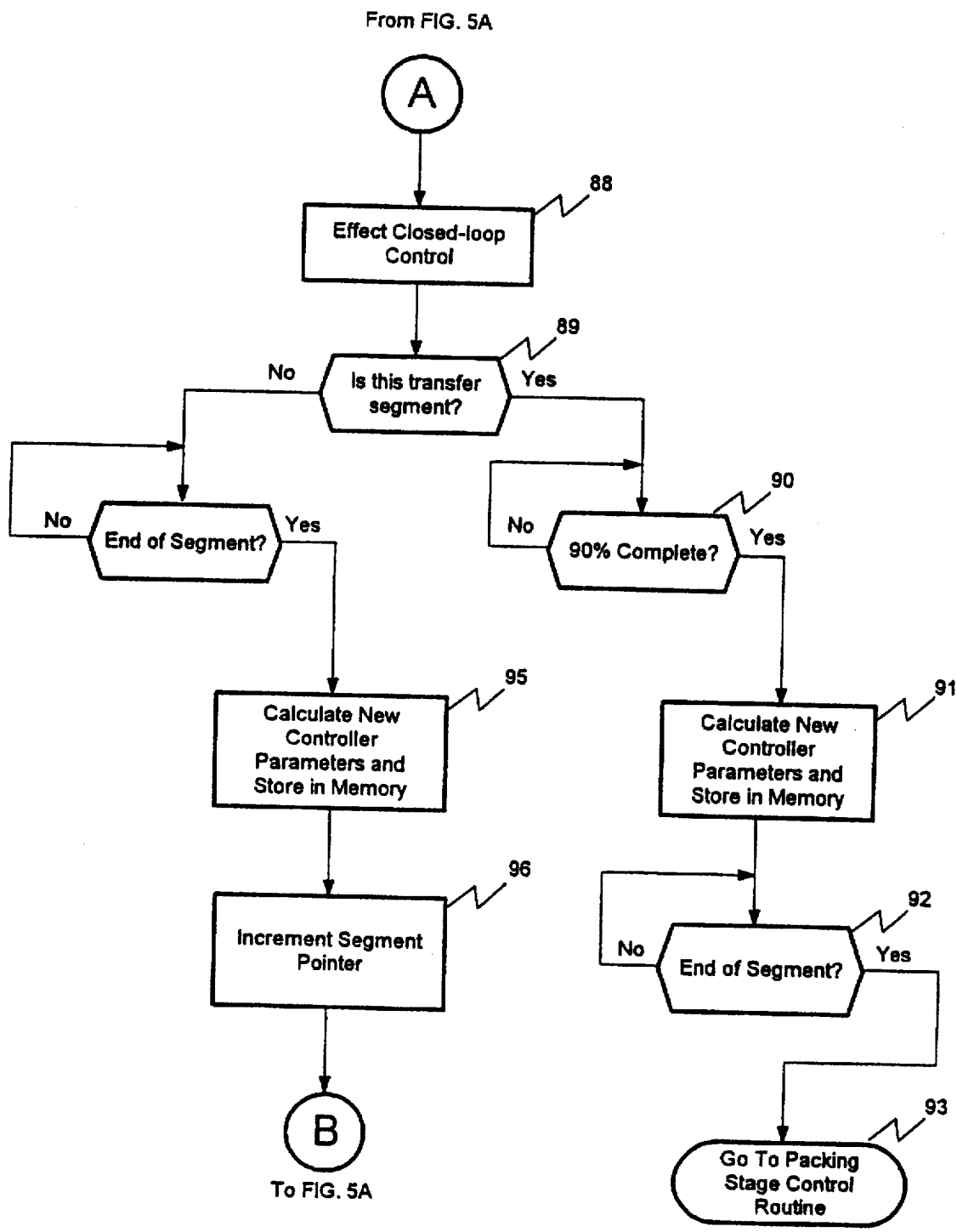

In this regard, reference is made to FIGS. 5A and 5B, which, collectively, show a top-level software flowchart depicting the principal functional components of the preferred embodiment. At the beginning of the injection cycle the various control parameters are initialized at step 80. Then, control begins by retrieving the first, or next, segment setpoint from memory (step 82), and an approximate open-loop time period is calculated (step 99). This approximate open-loop time is calculated based up the steptime, the present velocity of the ram 32 and the setpoint velocity, and defines the maximum period of time that the controller 42 will operate in the open-loop mode. The control equations and control parameters are also read from memory (step 83), which are utilized to effect open-loop control (step 84) over the flow control valve 40, in accordance with the open-loop control equation.

Before entering the open-loop control mode, however, a comparison is made (at step 98) between the present setpoint and the setpoint of the previous segment. If the setpoints are the same, it may be assumed that the ram 32 is presently moving at or near the target velocity and open-loop control may be bypassed. Accordingly, control is passed directly to the closed loop control equation. If, however, the setpoints are different, open-loop control is effected.

While implementing open-loop control, the controller 42 (see FIG. 1) monitors the actual ram 32 velocity (step 85). When this velocity reaches one-half of the step value (i.e., differential between previous setpoint and present setpoint), the controller 42 logs the time required to reach this point from the beginning of the segment. Due to the generally exponential shape of the actual velocity curve (see FIG. 3B), the open-loop time duration is set at 4 times the present elapsed time (step 86). It is assumed that, at that time, the actual ram velocity will be very close to the setpoint value, and closed-loop control may be assumed. Driving the actual ram velocity to a value near the setpoint, in this way, permits relatively simple closed-loop control to be effected.

If, however, the open-loop control equation fails to close the gap from the previous setpoint toward the present setpoint, control will nevertheless be switched to the closed-loop equation. Specifically, if the time estimated at step 99 has expired (regardless of the ram velocity), control will be switched to the closed-loop equation.

Once the open-loop control has reached the calculated end time (step 87), closed-loop control is assumed (step 88). A check is made here to determine whether the current segment is the final segment in the injection stage, or transfer segment (step 89). Preferably, the transfer segment is treated differently, due to the behavior of the ram 32 near the end of the injection stroke. In all other injection segments, an evaluation is made at the end of the segment, comparing the controller output and the actual ram velocity. These values are utilized to update the control parameters, for the corresponding segment in the subsequent injection cycle. However, as the ram 32 reaches the end of the stroke, and the mold 22 has filled with molten plastic, the ram velocity decreases significantly. As a result, actual and setpoint values may reflect significant error, even though the control parameters are appropriately set.

It has been determined that better performance is achieved, for the transfer segment, making the evaluation of target and actual values and computing the control parameters at some time prior to the end of that segment. Specifically, it has been found that making these evaluations and computations at the 90 percent mark (i.e., segment 90 percent complete), attains a desirable performance.

Therefore, if the present segment is the transfer segment, the controller 42 determines whether the segment is 90 percent complete (step 90). If so, it computes the control parameters and stores them to memory for use in the transfer segment of the next mold cycle (step 91). It then waits for the end of the segment (step 92), and transfers subsequent control to the packing stage routine (step 93). If the present segment is not the transfer segment, the appropriate evaluation and parameter computations are made at the end of the segment and stored to memory for use in the corresponding segment of the subsequent injection cycle (step 95). Thereafter, the segment pointer is increased (step 96) and process returns to step 82 and repeats.

It is noted that the packing and holding stages implement a combined open-loop/closed-loop control approach, similar to that discussed above, except that hydraulic pressure control, rather than ram velocity control, is implemented. Nevertheless, the concepts and teachings of the present invention as presented above are equally applicable to the packing and holding stages. That is, the control parameters defining open-loop and closed-loop control equations can be modified in the fashion described above to achieve pressure control by controlling the pressure relief valve 46 (FIG. 1), instead of the flow control valve 40.

All of the references cited herein are hereby incorporated in their entireties by reference.

The foregoing description of various preferred embodiments of the invention has been presented for purposes of illustration and description. It is not intended to be exhaustive or to limit the invention to the precise forms disclosed. Obvious modifications or variations are possible in light of the above teachings. For example, while the preferred embodiment of the present invention has been described in connection with an injection molding controller 42 directed to alternatively control a flow control valve 40 and a pressure relief valve 46, the broad control concepts of the present invention applies equally to single valve systems. That is, some injection molding systems are entirely controlled (through all stages) by a single flow control valve 40 or a single pressure relief valve. And the present invention is applicable to these systems as well. Other systems are known that utilize multiple flow and pressure relief valves, and the present invention is applicable to these systems as well.

The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A controller for use with an injection molding apparatus having a ram that moves within a cylinder to force molten plastic contained within the cylinder into an injection mold that is disposed in fluid communication with the cylinder, the controller comprising:
   a first set of parameters that operate upon a stored setpoint, the first set of parameters defining a first control equation for controlling the movement of the ram in an open-loop mode;
   a second set of parameters that operate upon a stored setpoint, the second set of parameters defining a second control equation for controlling the movement of the ram in a closed-loop mode;
   a memory for storing the first and second sets of controller parameters; and
   processing means in communication with the memory, the processing means configured to retrieve the stored setpoints and the first and second sets of parameters and to effect controlled movement of the ram in accordance with the first and second control equations, the processor further configured to evaluate the movement of the ram in comparison to the setpoints and update the first and second sets of controller parameters for use with stored setpoints in subsequent injection cycles.

2. The controller according to claim 1, wherein processor evaluates the movement of the ram at the end of a control segment.

3. In an injection molding apparatus having a ram that is controlled to move within a cylinder containing molten plastic to force the plastic from the cylinder and into a mold, the ram controlled in accordance with one or more segments defined by setpoints and control equations, the control equations operating on the setpoints to define the movement of the ram, a method of controlling the ram during the injection cycle comprising the steps of:
   retrieving from memory a first and second control equation;
   controlling the movement of the ram for a predetermined time during a first portion of each segment in accordance with the first control equation;
   monitoring the movement of the ram to detect a predetermined movement of the ram and, if the predetermined movement is detected before the predetermined time, controlling the movement of the ram during a second portion of each segment in accordance with the second control equation;
   evaluating the movement of the ram near the end of each segment; and
   updating the first and second control equations for use in the corresponding segments of subsequent injection cycles.

4. The method according to claim 3, further including the step of calculating a predetermined time for controlling the movement of the ram in accordance with the first control equation.

5. The method according to claim 3, further including the step of calculating a predetermined time for controlling the movement of the ram in accordance with the first control equation, based upon a steptime, current ram velocity and the ram setpoint velocity.

6. The method according to claim 3, wherein the predetermined movement of the monitoring step is a predetermined ram velocity.

7. The method according to claim 6, wherein the predetermined ram velocity is a velocity equal to one-half the sum of the setpoint of the previous segment and the setpoint of the present segment.

8. A controller for use with an injection molding apparatus comprising:
   a first set of controller parameters that operate upon a stored setpoint, the first set of controller parameters defining the controller operation for an open-loop mode;
   a second set of controller parameters that operate upon a stored setpoint, the second set of controller parameters defining the controller operation for a closed-loop mode;
   a memory for storing the first and second sets of controller parameters; and
   a processor in communication with the memory, the processor operative to execute controller operations as defined by the first and second set of controller parameters and the stored setpoints, the processor being further configured to evaluate the controller performance during an injection cycle and update the first and second set of controller parameters based upon the performance evaluation, whereby the updated controller parameters are stored in the memory for use by the processor with the stored setpoints in subsequent injection cycles.

9. The controller according to claim 8, wherein the processor is further configured to calculate a time for executing the controller operations as defined by the first controller parameters.

10. A controller for use with an injection molding apparatus having a ram that moves within a cylinder to force molten plastic contained within the cylinder into an injection mold that is disposed in fluid communication with the cylinder, the controller operative to control a flow control valve that is in fluid communication with the ram wherein movement of the ram is controlled by the flow control valve, the controller comprising:
   a first set of parameters that operate upon a stored setpoint, the first set of parameters defining a first control equation for controlling the state of the flow control valve in an open-loop mode;
   a second set of parameters that operate upon a stored setpoint, the second set of parameters defining a second control equation for controlling the state of the flow control valve in a closed-loop mode;
   a memory for storing the first and second sets of controller parameters; and
   processing means in communication with the memory, the processing means configured to retrieve the stored setpoints and the first and second sets of parameters and to control the state of the flow control valve in accordance with the first and second control equations, the processor further configured to evaluate the movement of the ram in comparison to the setpoints and update the first and second sets of controller parameters for use with the stored setpoints in subsequent injection cycles.

11. The controller according to claim 10, wherein the processor is configured to calculate a predetermined time for which to control the control valve in the open-loop mode.

12. The controller according to claim 11, further including means for monitoring the movement of the ram in comparison to the previous and present setpoints, and detecting a predetermined threshold value of ram movement.

13. The controller according to claim 12, wherein the processor is operative to switch control of the flow control valve from open-loop control to closed-loop control at a time related to time that the predetermined threshold was detected.

14. The controller according to claim 13, wherein the predetermined threshold value is the midpoint between the previous setpoint and the current setpoint.

15. The controller according to claim 13, wherein the predetermined threshold value is the midpoint between the present ram velocity and the current setpoint.

16. The controller according to claim 14, wherein the controller is operative to switch from the open-loop control to the closed-loop control at a time approximately four times the time that the predetermined threshold was detected.

* * * * *